(12) United States Patent
Hayut et al.

(10) Patent No.: US 10,164,905 B2
(45) Date of Patent: Dec. 25, 2018

(54) EFFICIENT MANAGEMENT OF NETWORK TRAFFIC IN A MULTI-CPU SERVER

(71) Applicant: Mellanox Technologies Ltd., Yokneam (IL)

(72) Inventors: Ofer Hayut, Kvutzat Yavne (IL); Noam Bloch, Bat Shlomo (IL); Shlomo Raikin, Kibbutz Yassur (IL); Liran Liss, Atzmon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 465 days.

(21) Appl. No.: 14/608,265

(22) Filed: Jan. 29, 2015

(65) Prior Publication Data
US 2015/0222547 A1  Aug. 6, 2015

Related U.S. Application Data

(60) Provisional application No. 61/936,345, filed on Feb. 6, 2014.

(51) Int. Cl.
*H04L 12/803* (2013.01)
*H04L 12/721* (2013.01)
*H04L 12/931* (2013.01)

(52) U.S. Cl.
CPC .................. *H04L 49/00* (2013.01)

(58) Field of Classification Search
CPC ......... H04L 49/00; H04L 45/74; H04L 49/90; H04L 69/00; H04L 69/12; H04L 69/18; H04L 69/324; H04L 12/46; H04L 12/4633; H04L 12/4641; H04L 12/18; G06F 9/505; G06F 13/385; G06F 9/455;
(Continued)

(56) References Cited

U.S. PATENT DOCUMENTS

| 7,656,894 B2* | 2/2010 | Dube | G06F 9/5044 370/463 |
| 7,797,460 B2* | 9/2010 | Kinsey | G06F 9/45558 370/254 |

(Continued)

FOREIGN PATENT DOCUMENTS

WO   WO 2013063791 A1 *  5/2013  .......... H04L 63/0209

OTHER PUBLICATIONS

Hyper Transport Technology Consortium, "HyperTransport I/O Link Specifications," revision 3.10c, Document No. HTC20051222-0046-0035, 443 pages, May 6, 2010.

*Primary Examiner* — Tu T Nguyen
(74) *Attorney, Agent, or Firm* — D.Kligler IP Services Ltd.

(57) ABSTRACT

A Network Interface Controller (NIC) includes a network interface, a peer interface and steering logic. The network interface is configured to receive incoming packets from a communication network. The peer interface is configured to communicate with a peer NIC not via the communication network. The steering logic is configured to classify the packets received over the network interface into first incoming packets that are destined to a local Central Processing Unit (CPU) served by the NIC, and second incoming packets that are destined to a remote CPU served by the peer NIC, to forward the first incoming packets to the local CPU, and to forward the second incoming packets to the peer NIC over the peer interface not via the communication network.

26 Claims, 5 Drawing Sheets

(58) Field of Classification Search
CPC ............. G06F 9/45533; G06F 9/45558; G06F 9/4812; H04W 28/02; H04W 28/22; H04W 52/18; H04W 52/38
USPC .................................................. 709/250, 223
See application file for complete search history.

(56) References Cited

U.S. PATENT DOCUMENTS

| | | | | |
|---|---|---|---|---|
| 7,895,331 | B1* | 2/2011 | Amir | G06F 9/505 370/230.1 |
| 8,073,979 | B2* | 12/2011 | Kinsey | G06F 9/45558 370/254 |
| 8,799,547 | B2* | 8/2014 | Mahadevan | G06F 9/4812 710/260 |
| 2004/0158651 | A1* | 8/2004 | Fan | H04L 29/06 710/1 |
| 2006/0047862 | A1* | 3/2006 | Shearer | H04L 41/08 710/15 |
| 2008/0109562 | A1* | 5/2008 | Ramakrishnan | H04L 49/90 709/250 |
| 2010/0241831 | A1* | 9/2010 | Mahadevan | G06F 9/4812 712/42 |
| 2011/0010469 | A1* | 1/2011 | Kinsey | G06F 9/45558 709/250 |
| 2011/0119673 | A1* | 5/2011 | Bloch | G06F 9/546 718/102 |
| 2013/0125125 | A1* | 5/2013 | Karino | G06F 9/455 718/1 |
| 2013/0254436 | A1* | 9/2013 | Chhabra | H04L 63/0485 710/33 |
| 2014/0059266 | A1* | 2/2014 | Ben-Michael | G06F 13/385 710/313 |
| 2014/0059537 | A1* | 2/2014 | Kamble | G06F 9/45558 718/1 |
| 2014/0254594 | A1* | 9/2014 | Gasparakis | H04L 45/74 370/392 |

* cited by examiner

EFFICIENT MANAGEMENT OF NETWORK TRAFFIC IN A MULTI-CPU SERVER

CROSS-REFERENCE TO RELATED APPLICATIONS

This application claims the benefit of U.S. Provisional Patent Application 61/936,345, filed Feb. 6, 2014, whose disclosure is incorporated herein by reference.

FIELD OF THE INVENTION

The present invention relates generally to communication networks, and particularly to methods and systems for managing network traffic in a multi-CPU server.

BACKGROUND OF THE INVENTION

Various computing systems comprise multiple servers communicating over a communication network using network interfacing means. For example, U.S. Pat. No. 8,799,547, whose disclosure is incorporated herein by reference, describes a method for processing a data packet in a network server system comprising at least one central processor unit (CPU) having a plurality of cores. The network server comprises a network interface for forming a connection between a network and a designated CPU core, such that for each of the data packets received from the network, an interrupt is created in the designated CPU core for processing the received data packet. Each data packet received from the network is associated with an application connection established in a CPU core that is selected based on processor load, and an interrupt thread is created on the CPU core associated with the application connection for processing the data packet.

SUMMARY OF THE INVENTION

An embodiment that is described herein provides a Network Interface Controller (NIC) that includes a network interface, a peer interface and steering logic. The network interface is configured to receive incoming packets from a communication network. The peer interface is configured to communicate with a peer NIC not via the communication network. The steering logic is configured to classify the packets received over the network interface into first incoming packets that are destined to a local Central Processing Unit (CPU) served by the NIC, and second incoming packets that are destined to a remote CPU served by the peer NIC, to forward the first incoming packets to the local CPU, and to forward the second incoming packets to the peer NIC over the peer interface not via the communication network.

In some embodiments, the steering logic is configured to receive peer packets sent by the peer NIC over the peer interface, to classify the peer packets into first peer packets that are destined to the communication network, and second peer packets that are destined to the local CPU, and to forward the first peer packets to the communication network over the network interface and the second peer packets to the local CPU.

In other embodiments, the steering logic is configured to receive CPU instructions that carry data produced by the local CPU, to classify the CPU instructions into first CPU instructions destined to the communication network and second CPU instructions destined to the remote CPU, and to forward the first CPU instructions to the communication network over the network interface and the second CPU instructions to the remote CPU via the peer interface.

In an embodiment, the NIC includes offloading circuitry that is configured to apply an offloading task, the steering logic is configured to provide to the offloading circuitry to the first incoming packets. In another embodiment, the offloading circuitry is configured to apply the offloading task by selecting the offloading task from among multiple predefined tasks, based on metadata embedded in the first incoming packets. In yet another embodiment, the steering logic is configured to receive peer packets sent by the peer NIC over the peer interface, and to apply the offloading task to the peer packets.

In some embodiments, the steering logic is configured to classify the incoming packets received over the network interface based on destination data embedded in the incoming packets. In other embodiments, the steering logic is configured to receive remote CPU instructions that carry data sent by the remote CPU, and local CPU instructions that carry data sent by the local CPU, to select a first outbound destination for the remote CPU instructions from between the communication network and the local CPU, and a second outbound destination for the local CPU instructions from between the communication network and the remote CPU. In yet other embodiments, the steering logic is configured to select the first and second outbound destinations based on destination information embedded in the remote CPU instructions and in the local CPU instructions.

There is additionally provided, in accordance with an embodiment that is described herein, a method in a Network Interface Controller (NIC), including receiving incoming packets from a communication network. The received incoming packets is classified into first incoming packets that are destined to a local Central Processing Unit (CPU) served by the NIC, and second incoming packets that are destined to a remote CPU served by a peer NIC. The first incoming packets are forwarded to the local CPU, and the second incoming packets are forwarded to the peer NIC over a peer interface not via the communication network.

There is further provided, in accordance with an embodiment that is described herein, a network node including first and second Central Processing Units (CPUs), and first and second Network Interface Controllers (NICs) coupled respectively to the first and second CPUs. The first and second CPUs are configured to communicate with one another over a bus. The second NIC is configured to receive packets from a communication network, to classify the packets into first packets that are destined to the first CPU, and second packets that are destined to the second CPU, to forward the second packets to the second CPU, and to forward the first packets to the first NIC over the bus not via the communication network.

The present invention will be more fully understood from the following detailed description of the embodiments thereof, taken together with the drawings in which:

DETAILED DESCRIPTION OF EMBODIMENTS

Overview

Figure 1:
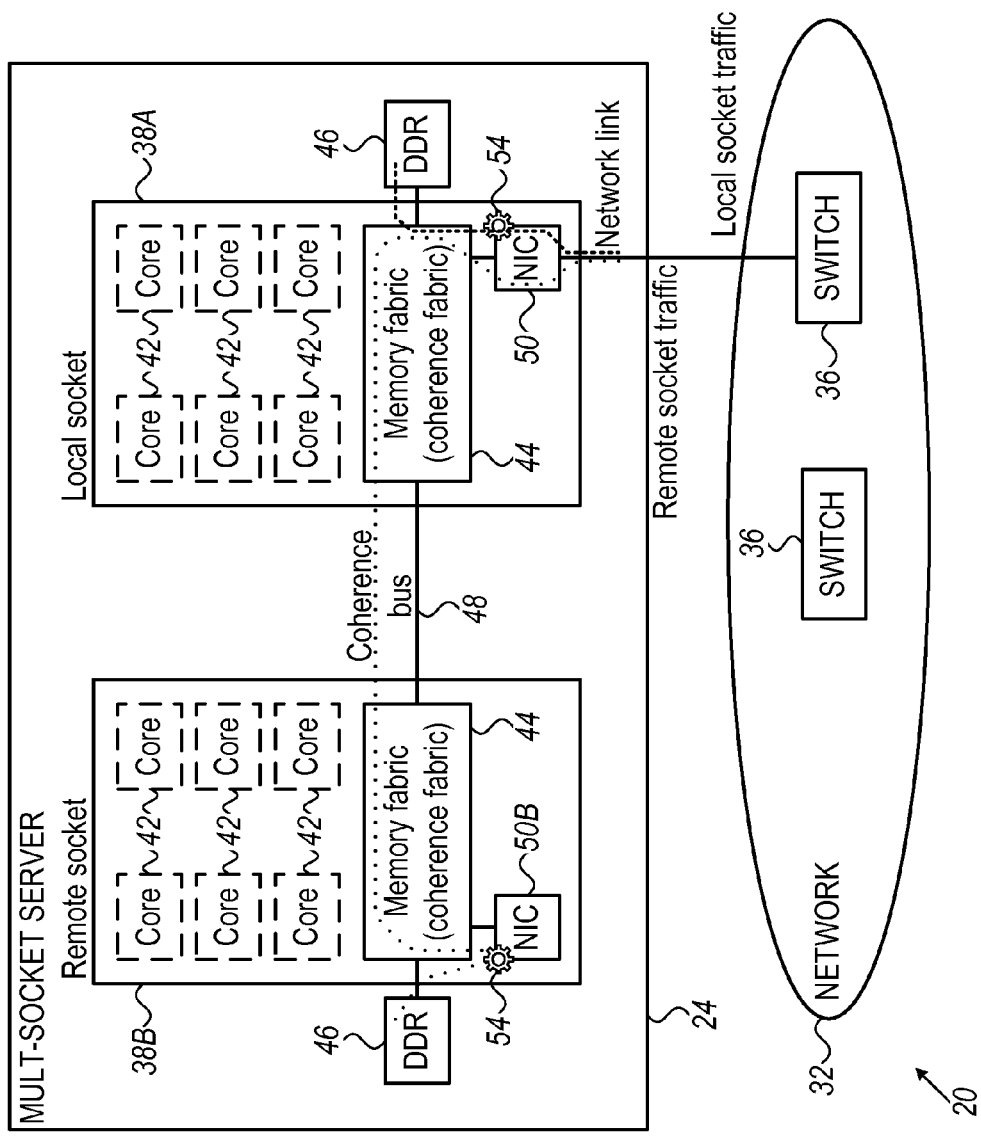
FIG. 1 is a block diagram that schematically illustrates a computer system including a multi-CPU server, in accordance with an embodiment that is described herein.

Various computing systems comprise multiple compute servers that communicate with one another over a communication network. The description that follows refers mainly to a multi-CPU server, in which each CPU comprises one or more processing cores and a Network Interface Controller (NIC). Embodiments that are described herein provide methods and systems for efficient management of network traffic in such a multi-CPU server. In some embodiments, the CPUs of the multi-CPU server are interconnected using a coherence bus, such as the Intel's QPI bus or the Hyper-Transport bus.

To communicate with another server, each CPU may in principle connect to the network via a dedicated NIC. Such a solution, however, may be prohibitively expensive since it requires a physical cable and/or on-board wiring and a port in a network switch, per NIC.

In some multi-CPU servers, each CPU comprises an embedded or integrated NIC. The CPUs in such a server may in principle access the network using the NIC of only one of the CPUs. This solution requires only a single cable and a single switch port, but at heavy traffic loads the NIC may fail to provide offloading services to the multiple CPUs. Alternatively, each of the multiple CPU may access the network using its own embedded CPU to advantageously offload each CPU using its embedded NIC. This alternative solution, however, requires a cable and a switch port per CPU and is therefore expensive to implement.

In the disclosed embodiments, each of the CPUs in the multi-CPU server has a respective NIC (e.g., integrated within the CPU chipset), but not all the NICs are connected physically to the network. In other words, the NIC of at least one CPU of the multi-CPU server is not connected physically to the network. In some embodiments, any NIC in the multi-CPU server can be configured to connect to the network directly, or indirectly via the NIC of another CPU via the coherence bus.

A NIC that has a direct physical network connection is referred to herein as a connected NIC, and the CPU whose NIC is connected to the network is referred to herein as a connected CPU. A NIC having no direct network connection is referred to herein as an unconnected NIC, and a CPU having an unconnected NIC is referred to herein as an unconnected CPU. As will be described below, in some embodiments, an unconnected CPU can access the network using the NIC of a connected CPU in the same server.

In some embodiments, the NIC comprises a network interface for receiving packets over the communication network, and a peer interface for communicating with a peer NIC not via the communication network. The NIC further comprises steering logic that includes a dispatcher. The dispatcher classifies the incoming packets received over the network interface into first incoming packets that are destined to the connected CPU served by the NIC, and second incoming packets that are destined to a remote CPU served by the peer NIC. The dispatcher can classify the packets received over the network interface, for example, based on destination information embedded in the packets.

In an embodiment, the NIC can operate in either a local or remote mode. When operating in the local mode, the NIC configures the steering logic to forward the first incoming packets to the connected CPU, and the second incoming packets to the peer NIC over the peer interface.

In some embodiments, the NIC receives peer packets over the peer interface and classifies the peer packets into first peer packets that are destined to the communication network, and second peer packets that are destined to the CPU served by the NIC. The steering logic forwards the first peer packets to the communication network over the network interface when configured in the local mode, and forwards the second peer packets to the CPU served by the NIC when configured in the remote mode.

In some embodiments, the NIC receives CPU instructions from the CPU served by the NIC. For example, the CPU may instruct the NIC to generate one or more packets and send the generated packets over the network or over the peer interface. The NIC classifies the CPU instructions (or the packets generated by the instructions) into first CPU instructions destined to the communication network and second CPU instructions destined to the remote CPU. The steering logic forwards the first CPU instructions to the communication network over the network interface when configured in the local mode, and forwards the second CPU instructions to the remote CPU via the peer interface when configured in the remote mode.

In an embodiment, the NIC balances the workload among the CPU served by the NIC and remote CPUs by applying load balancing techniques to packets that are destined to the CPU served by the NIC.

In some embodiments, the NIC comprises an offloading unit that is configured to apply an offloading task to packets destined to the CPU served by the NIC. The NIC may apply the offloading task to packets arriving from the network and/or from a peer NIC over the peer interface, as appropriate. Typically, the offloading unit selects the offloading task from among multiple predefined tasks, based on metadata embedded in header areas of the packets.

In some embodiments, the NIC configures the steering logic in the local or remote mode statically. Typically, a connected NIC operates in the local mode, and an unconnected NIC in the remote mode. In other embodiments, the steering logic switches between the local and remote modes based on metadata embedded in the peer packets and CPU instructions.

In the disclosed techniques, each of the CPUs has a dedicated NIC but only some of the NICs are connected physically to the network, thus saving connection costs. The CPUs having unconnected NICs can access the network using the connected NICs. Both the connected and unconnected NICs can apply offloading tasks, thus reducing the complexity of each individual NIC.

In some embodiments, each NIC may be used for offloading regardless of whether the NIC is connected or unconnected. Only a connected NIC, however, handles communication link layer and physical layer tasks such as buffer management, flow control, error correction and the like.

System Description

FIG. 1 is a block diagram that schematically illustrates a computer system 20 including a multi-CPU server 24, in accordance with an embodiment that is described herein.

System 20 can be used in various applications, such as in server farms, campus or industrial computation systems, storage systems, data center systems and the like. Although FIG. 1 depicts only one server 24, system 20 typically comprises multiple servers such as server 24 (or other devices) that communicate with one another over a communication network 32. Compute (and other) nodes such as, for example, server 24 that are attached to network 32 are collectively referred to herein as "network nodes" or simply "nodes," for brevity.

In the example of FIG. 1, network 32 comprises multiple network switches 36 that deliver the communicated data among the network nodes. In alternative embodiments, instead of or in addition to switches 36, any other suitable switching and/or routing network components can be used also.

System 20 may use any suitable type of communication network and related protocols. For example, the network may comprise a local or a wide area network (WAN/LAN), a wireless network, or a combination of such networks. Additionally, the network may be a packet network such as IP (e.g., with TCP as the transport protocol), Infiniband, or Ethernet network, delivering information at any suitable data rate.

In FIG. 1, server 24 comprises two CPU units 38, each comprises one or more compute cores 42 and a memory fabric 44. Each CPU 38, which is also referred to herein as a CPU socket, has an associated Double Rata Rate (DDR) Synchronous Dynamic Random-Access Memory (SDRAM) 46. In the description that follows the terms "socket CPU", "CPU" and "socket" are used interchangeably.

CPU 38 additionally comprises a Network Interface Controller (NIC) 50, which may be physically connected (or not) to network 32 using a port of switch 36. CPU 38 typically comprises an internal bus (not shown) such as, for example, the Peripheral Component Interconnect Express (PCIe) bus, over which the CPU or compute cores 42 access respective DDR memory 46, NIC 50 or both. Alternatively, any other suitable internal bus other than PCIe can also be used.

In the context of the present disclosure and in the claims, the term CPU refers to socket 38 as a whole, including cores 42, and other peripheral units such as memory fabric 44, DDR memory 46, NIC 50 and any other peripheral unit and interconnections of the socket. In the description that follows, an operation done by the CPU refers to the operation that is done by one of the respective cores.

Server 24 comprises a coherence bus 48 over which CPUs 38 may communicate with one another. Coherence bus enables a given CPU to efficiently access the DDR memory (or other elements or resources) in another CPU without connecting to the network, and to retain coherency among multiple DDRs 46 (or other memories) of respective CPUs 38 that store or cache duplicate data.

Coherence bus 48 may comprise any suitable coherence bus and related protocols such as, for example, the Intel's QuickPath Interconnect (QPI) bus, or the HyperTransport (HT) bus. The HT specifications are described, for example, in "HyperTransport™ I/O Link Specifications," revision 3.10c, May 6, 2010, Document number: HTC20051222-0046-0035, whose disclosure is incorporated herein by reference.

In the disclosed embodiments, not all NICs 50 of CPUs 38 connect physically to the network. In the example of FIG. 1, NIC 50A of CPU 38A connects physically to network 32, whereas NIC 50B of CPU 38B does not. A CPU whose NIC has no physical connection to the network can access the network using the NIC of another CPU, as will be described in detail below. In the example of FIG. 1, both CPUs 38A and 38B access the network using NIC 50A of CPU 38A.

A CPU and respective NIC with a physical network connection are referred to herein as connected CPU and connected NIC, respectively. A connected CPU can connect to network 32 directly via its respective NIC. A CPU and respective NIC having no physical network connection are referred to herein as an unconnected CPU and unconnected NIC, respectively. A remote CPU served by an unconnected peer NIC can access the network only via the NIC of a connected CPU.

NIC 50 comprises an offloading unit 54 (also referred to herein as offloading circuitry), which can be used for offloading CPU 38 of various processing tasks by applying certain processing to data delivered to the CPU via the NIC. For example, in connected CPU 38A, offloading unit 54 can apply packet processing to traffic coming from the network, or to data sent from remote unconnected CPU 38B over coherence bus 48, to offload CPU 38A.

Offloading unit 54 may comprise one or more dedicated processing units (not shown), such as, for example, an encryption and decryption engine, firewall functionality and the like. NIC 50 can select an offloading task to be applied by offloading unit 54, for example, based on metadata embedded in the packets. Alternatively, NIC 50 can select a desired offloading task in offloading unit 54 or choose not to apply any processing offloading, using any other suitable selection criterion.

The NIC of a remote CPU, e.g., CPU 38B, has no physical connection to the network and the CPU sends and receives data over coherence bus 48. In a disclosed embodiment, offloading unit 54 of an unconnected NIC can offload remote CPU 38B by delivering data received over the coherence bus to the CPU via the respective unconnected NIC. This feature is useful, for example, for exploiting the processing capabilities of unconnected NICs when integrated within CPUs 38.

Figure 2:
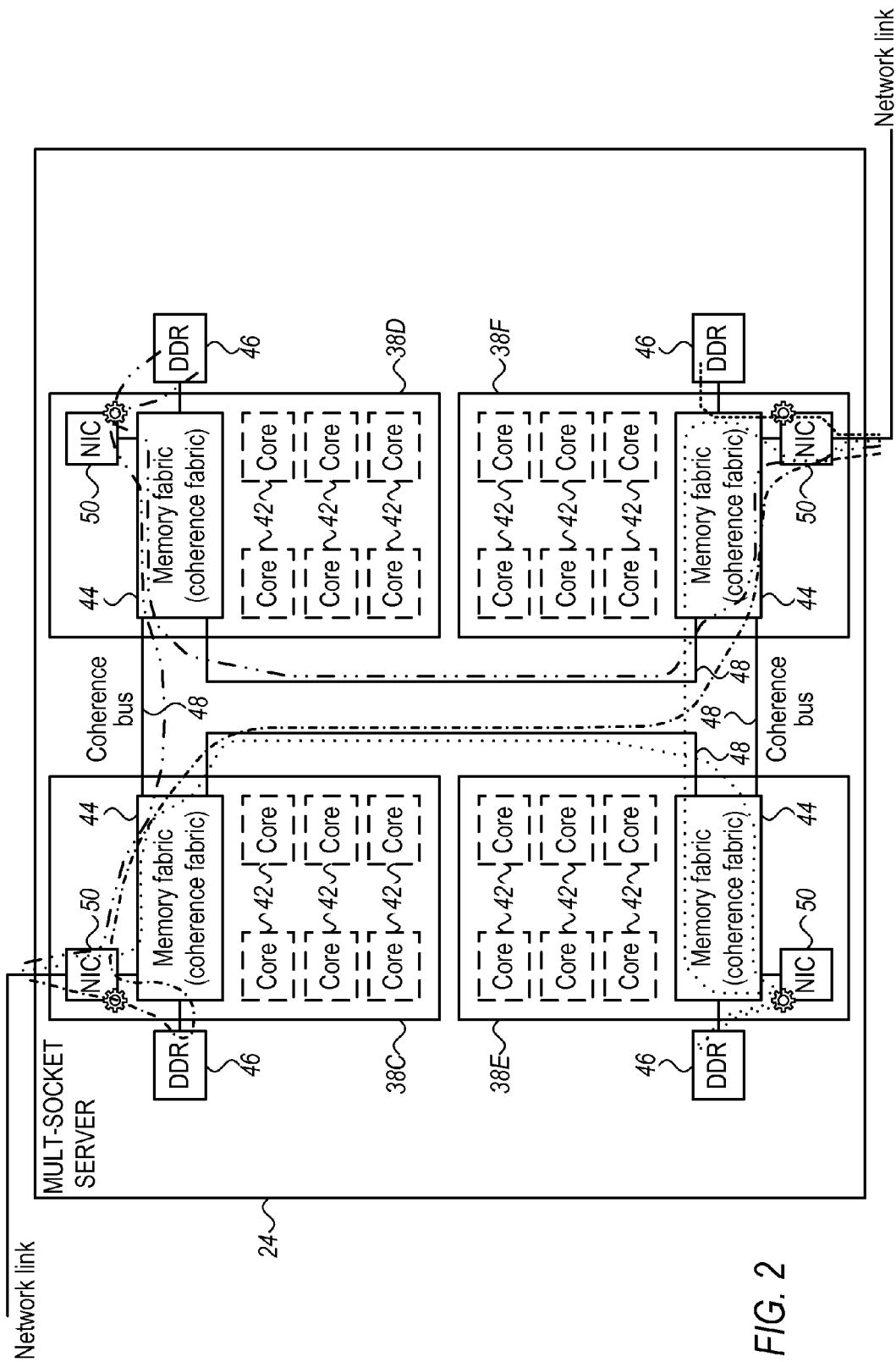
FIG. 2 is a block diagram that schematically illustrates packet flows in a server that includes four sockets, in accordance with an embodiment that is described herein.

FIG. 2 is a block diagram that schematically illustrates a server 24 that includes four sockets 38C . . . 38F, in accordance with an embodiment that is described herein. In the example of FIG. 2, NICs 50 of sockets 38C and 38F has physical connection to the network, whereas NICs 50 of sockets 38D and 38E have no direct connection to the network.

NIC 50 of CPU 38F classifies packets received from the network as destined to CPU 38F or to another CPU in server 24. When destined to CPU 38F, the NIC of CPU 38F processes the packet using offloading unit 54 (if necessary) and sends the packet to CPU 38F, e.g., for storage in respective DDR memory 46. When the received network packet is destined to one of unconnected CPUs 38D or 38E or to connected CPU 38C, the NIC of CPU 38F sends the packet to the relevant destination CPU over coherence bus 48. NIC 50 serving the destination CPU receives data over the coherence bus and can apply offloading using offloading unit 54 prior to delivering the data to the CPU, as explained above.

Connected CPUs 38C and 38F can send and receive packets over the network directly using the respective connected NICs. Each of unconnected CPUs 38D and 38E can communicate data over the network indirectly using NIC 50 of connected CPU 38C, 38F, or both. For example, CPU 38D can send data, over coherence bus 48 to the NIC of CPU 38F, which NIC delivers the data encapsulated in a suitable packet to the network.

Figure 4:
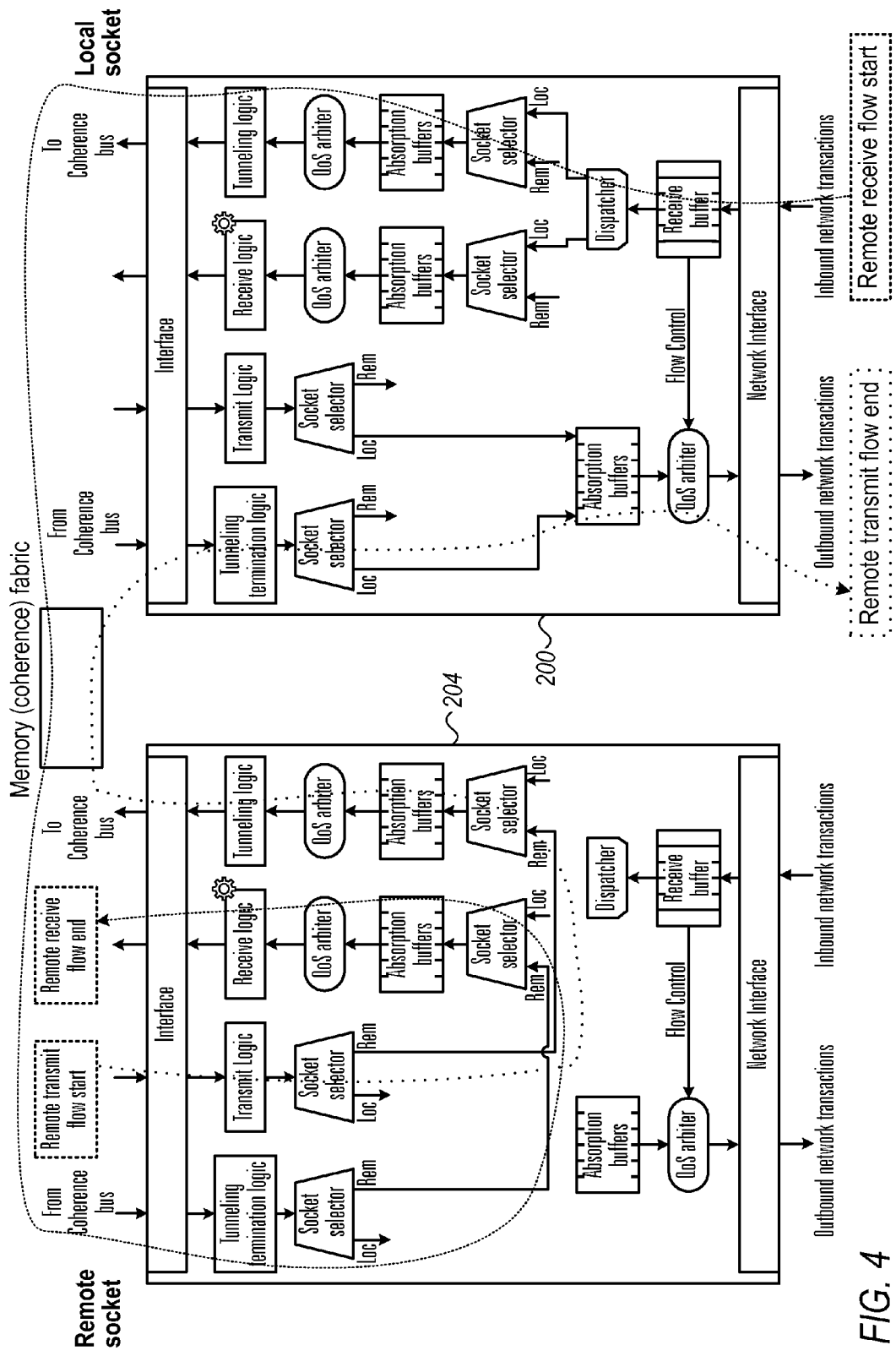
FIG. 4 is a diagram that schematically illustrates receiving and transmitting data flows between a remote socket and a network, in accordance with an embodiment that is described herein.
Figure 5:
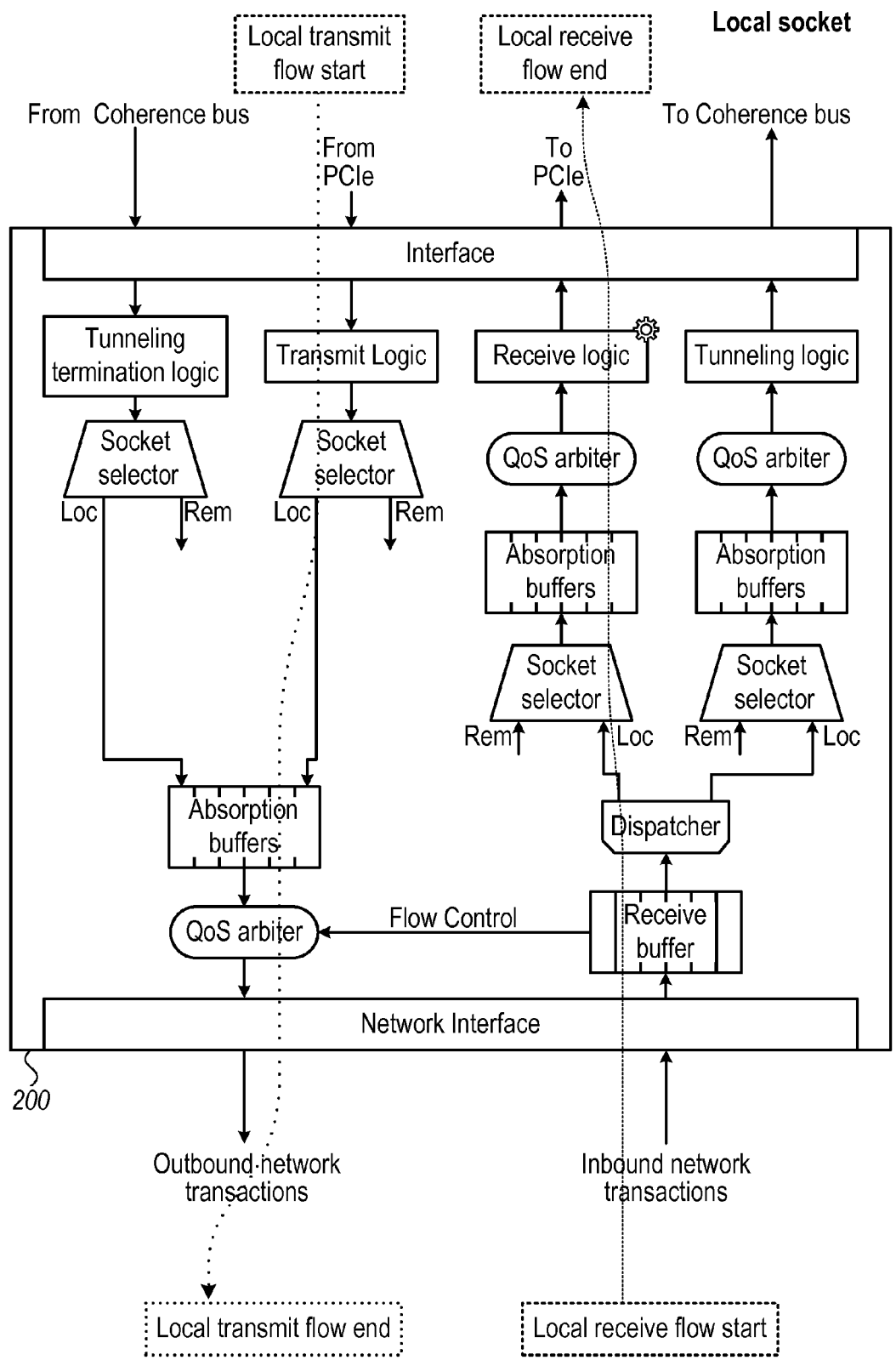
FIG. 5 is a diagram that schematically describes receiving and transmitting data flows between a local socket and a network, in accordance with an embodiment that is described herein.

FIG. 2 depicts different inbound flows of network packets from local CPUs 38C and 38F to each of the other (remote or local) CPUs. Detailed receive and transmit data flows are depicted in FIGS. 4 and 5 below.

An Example NIC Implemented in Hardware

Figure 3:
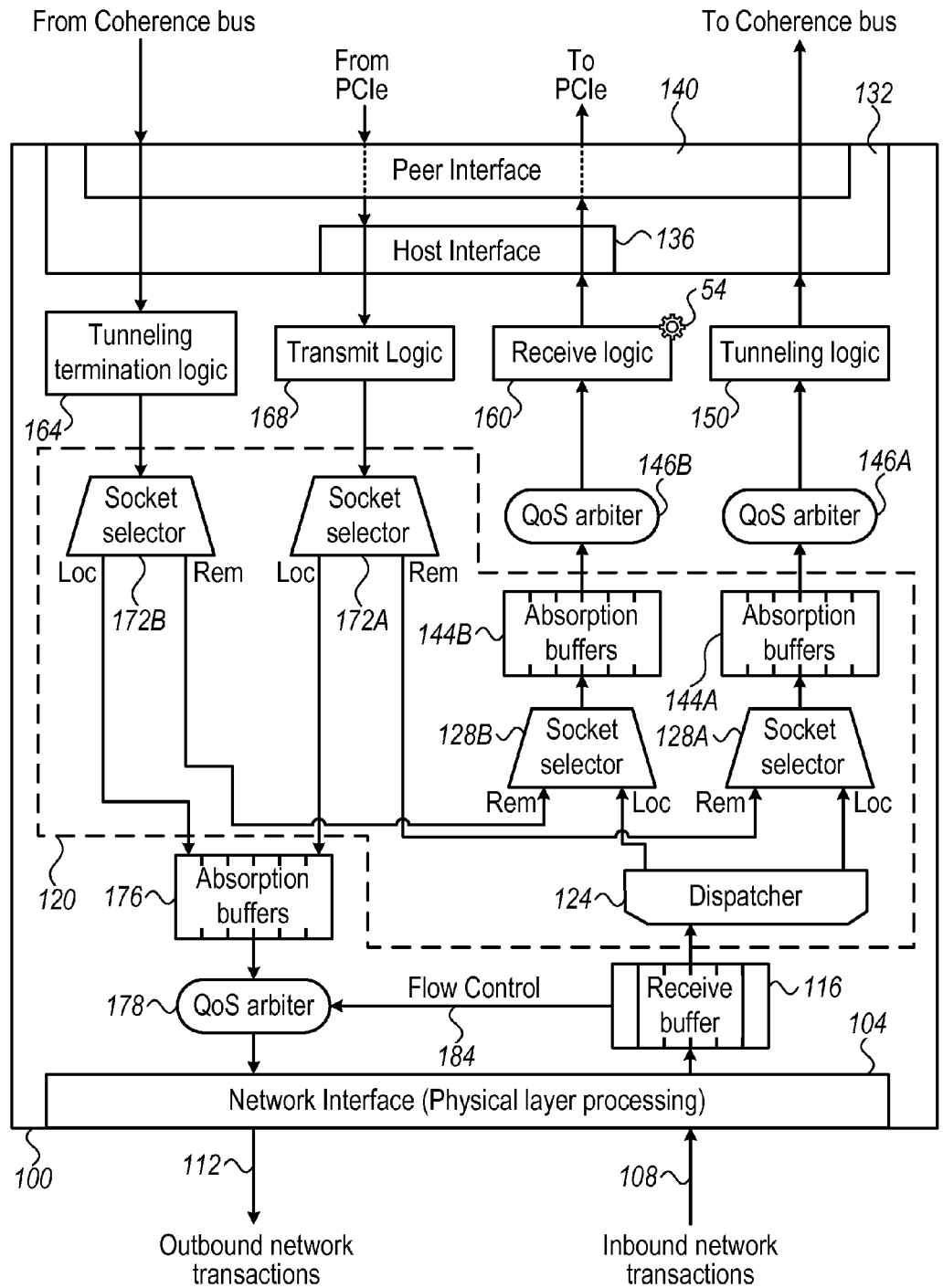
FIG. 3 is a block diagram that schematically illustrates the internal structure of a Network Interface Controller (NIC), in accordance with an embodiment that is described herein.

FIG. 3 is a block diagram that schematically illustrates the internal structure of a Network Interface Controller (NIC) 100, in accordance with an embodiment that is described herein. NIC 100 can be used, for example, in implementing NIC 50 of server 24 above. NIC 100 can be configures in a local or remote mode of operation. In some embodiments, the NIC's operation mode depends on whether the NIC has physical network connection or not (i.e., a static mode configuration). In other embodiments, a connected NIC can dynamically switch between local and remote operation modes, as will be described below.

NIC 100 comprises a network interface 104 that serves as a physical and electrical interface to network 32. In an embodiment, network interface 104 implements at least a physical layer protocol in accordance with the protocol(s) employed in communication network 32.

When operating in a local mode, NIC 100 connects to the network using network interface 104. Network interface 104 receives inbound traffic (e.g., packets) 108 from the network and delivers outbound traffic 112 to the network. NIC 100 buffers packets received from the network in a receive buffer 116, which functions as a global buffering stage and uses for managing flow control toward the network source sending the inbound traffic.

NIC 100 comprises steering logic 120 that manages the data flow within the NIC depending on the configured operation mode (i.e., local or remote). Steering logic 120 comprises a dispatcher 124 that handles packets received from the network. Dispatcher 124 classifies the received packets into packets destined to the CPU served by NIC 100 and packets destined to other CPUs, and directs the packets accordingly. Dispatcher 124 can use any suitable method for classifying the packets. In some embodiments, dispatcher 124 classifies the received packets based on destination information embedded in the packets. For example, dispatcher 124 can use destination information that is embedded in (or can be inferred from) the header area of the packet.

In an embodiment, dispatcher 124 classifies the packets based on layer-2 headers, layer-3 headers and/or higher layer headers of the packets. In some embodiments, the embedded destination information comprises a network address, such as, for example an IP address, a TCP port number or a combination of several address types. In other embodiments, the embedded destination information comprises a hash value, which NIC 50 calculates over the packet or part thereof.

In some embodiments, dispatcher 124 balances the workload among the CPUs of server 24 by dividing the data sent to the CPUs evenly. In some embodiments, dispatcher 124 applies load balancing techniques, such as, for example, Receive Side Scaling (RSS) load balancing techniques. Alternatively, dispatcher 124 can use any other suitable method for load balancing.

NIC 100 comprises an interface module 132, which comprises a host interface 136 and a peer interface 140. NIC 100 uses host interface 136 to communicate with the CPU served by the NIC. Host interface 136 may comprise any suitable link or bus, such as, for example PCIe. NIC 100 uses peer interface 140 to communicate with other CPUs over coherence bus 48, using, for example a suitable tunneling protocol that encapsulates the network packets in coherence transactions of the coherence bus. In a typical implementation, host interface 136 and peer interface 140 comprise different physical links, and employ different communication protocols. Alternatively, NIC 100 may communicate with the CPU served by the NIC using peer interface 140 and over coherence bus 48. Further alternatively, a connected NIC may communicate with a peer NIC using a peer-to-peer PCIe connection.

Steering logic 120 comprises configurable socket selectors 128. When NIC 100 operates in the local mode, sockets 128 are configured to output packets coming from dispatcher 124. When NIC 100 operates in the remote mode, sockets 128A and 128B are configured to output packets that carry data received via host interface 136, or peer interface 140, respectively.

Packets that NIC 100 delivers to another CPU over the coherence bus pass a processing route that includes an absorption buffer 144A, a Quality of Service (QoS) arbiter 146A and tunneling logic 150. In local mode, NIC 100 delivers over the coherence bus packets that the NIC receives form the network. In remote mode, the packets that NIC 100 delivers to the coherence bus originate in the CPU served by the NIC.

Absorption buffer 144A handles packet bursts, and QoS arbiter 146A controls the delivery priority of the packets toward the coherence bus (i.e., destined to far CPUs). In some embodiments, QoS arbiter 146A participates in flow control management as will be described below. In an embodiment, tunneling logic 150 encapsulates the packets in a coherence transaction packet in accordance with the underlying tunneling protocol.

Tunneling logic 150 may embed metadata within one or more of the packets sent over the coherence bus. In some embodiments, the metadata indicates a processing task to be applied to the packets at the remote NIC. The processing task can be selected among multiple offloading tasks that the receiving NIC supports. Alternatively or additionally, tunneling logic 150 may embed any other metadata to be used for any other suitable purpose.

Packets that NIC 100 delivers to the CPU served by the NIC pass a separate processing rout, including absorption buffer 144B, Quality of Service (QoS) arbiter 146B and receive logic 160. NIC 100 passes through this route packets that are received over the communication network or packets received from a remote CPU over the coherence bus.

Absorption buffer 144B handles packet bursts, and QoS arbiter 146B controls the priority delivery of the packets to the CPU served by NIC 100. In some embodiments, receive logic 160 may processes the packets using offloading unit 54 prior to delivery via host interface 136 to the CPU.

NIC 100 comprises tunneling termination logic 164, which accepts data received from remote CPUs via peer interface 140. In some embodiments, tunneling termination logic 164 receives tunneled peer packets that were sent by a peer NIC over the coherence bus. Logic tunneling termination 164 processes the tunneling protocol to recover the peer packets, and re-encapsulates the peer packets in wire packets that are suitable for delivery over the communication network.

NIC 100 additionally comprises transmit logic 168, which receives data such as CPU instructions from the CPU served by NIC 100 via host interface 136. In some embodiments, the CPU instructs the NIC to generate one or more packets to be sent over the network or coherence bus. Other CPU instructions may be used, for example, for configuring the NIC, querying the NIC's capabilities and the like. In response to an instruction for packet generation transmit logic 168 generates one or more wire packets that are suitable for delivery over the communication network. Note that transmit logic 168 and tunneling termination logic 164 operate independently of whether NIC 100 is configured in the local or remote mode.

Socket selectors 172A and 172B in NIC 100 accept packets from transmit logic 168 and tunneling termination logic unit 164, respectively, and can be configured to deliver the packets toward the network or interface 132. When NIC 100 is configured in the local mode, socket selectors 172A and 172B route the packets to the network via an absorption buffer 176 and a QoS arbiter 178.

When NIC 100 is unconnected and configured in the remote mode, socket selector 172A routes wire packets that were generated by transmit logic 168, as explained above, via socket selector 128A, toward tunneling logic 150, which adds tunneling headers to the packets for sending to the connected NIC over the coherence bus. Tunneling termination logic 164 of the connected NIC then recovers the wire packets from the tunneled packets by stripping out the tunneling headers, and delivers the recovered wire packets through socket selector 172B, absorption buffer 176, QoS arbiter 178 and network interface 112 to the network.

Absorption buffer 176 handles bursts of packets arriving via peer interface 140, host interface 136 or both. QoS arbiter 178 enforces delivery priorities between packets in absorption buffer 176 received from a remote CPU via peer interface 140, and packets in absorption buffer 176 received via host interface 136 from the CPU served by NIC 100. Additionally, QoS arbiter 178 manages flow control toward the network using flow control signaling 184 generated by receive buffer 116.

In some embodiments, QoS arbiter 146A participates in managing the flow control for traffic that remote CPUs deliver to the network via the connected NIC. For example, when absorption buffer 176 in the connected NIC becomes overfilled with traffic received over the coherence bus via tunneling logic 164, QoS 146A of the connected NIC sends flow control messages via tunneling logic 150 and over the coherence bus to the remote CPUs. The remote CPUs respond to the flow control messages by decreasing the sending data rate. When the overfill condition is resolved, QoS arbiter 146 may send flow control messages to the remote CPUs to increase the sending rate. Qos arbiters 146A and 178 can apply different flow control policies to packets of different delivery priorities.

Table 1 below summarizes the various data flows that NIC 100 supports when operating in the local and remote modes. Table 1 refers to a multi-CPU server in which CPU1 has a NIC (NIC1) connected directly to the network and that operates in the local mode. CPU2 has a NIC (NIC2) that has no direct connection to the network and that operates in the remote mode. CPU2 can access the network only via NIC1.

As seen in Table 1, NIC1 can send traffic received from the network to either CPU1 or CPU2, and can send to the network data originated in either CPU1 or CPU2. NIC2 can receive data that was receives by NIC1 over the network via the coherence bus, and deliver the data to CPU2. NIC2 can additionally send data originated by CPU2 over the coherence bus to NIC1, which sends the data to the communication network.

TABLE 1

Supported connectivity in local and remote operating modes.

| NIC | Data source | Data destination |
|---|---|---|
| NIC1 - connected, local mode | Network | CPU1 |
| | | CPU2 |
| | CPU1 | Network |
| | CPU2 | Network |
| NIC2 - unconnected, remote mode | CPU1 (over coherence bus) | CPU2 |
| | CPU2 (over coherence bus) | CPU1 |

In some embodiments, the configuration of the NIC in the local or remote mode is static. Typically, a NIC 100 that has direct network connection is configured to operate in the local mode, and a NIC that has no direct connection to the network is configured to operate in the remote mode. In such embodiments, socket selectors 128 and 172 are configured statically.

In other embodiments, when the NIC has a direct network connection, socket selectors 128 and 172 may be configured dynamically, for example, based on packet metadata that identifies the packet destination. To send packets received via host interface 136 or peer interface 140 to the network, NIC 100 configures socket selectors 172 in the local operation mode. To communicate packets over the coherence bus between the CPU served by the NIC and a remote CPU (rather than the network), NIC 100 switches selector sockets 128 and 172 as to the remote operation mode configuration.

Example Data Flows

FIG. 4 is a diagram that schematically illustrates receiving and transmitting data flows between a remote socket and a network, in accordance with an embodiment that is described herein. FIG. 4 depicts a connected NIC 200 of a local socket that enables the remote socket to access the network even though the remote socket has an unconnected NIC 204 with no direct network connection. In the example of FIG. 4, NICs 200 and 204 operate in the local and remote modes, respectively. The local and remote sockets communicate with one another over a coherence bus (such as bus 48 of FIG. 1 above) and via respective memory fabric units (such as memory fabric units 44 of FIG. 1 above). The internal structure of NICs 200 and 204 in FIG. 4 is similar to the structure of NIC 100 of FIG. 3 above. The numbers of the elements of NICs 200 and 204 are omitted from the figures for the sake of clarity, but the element numbers of NIC 100 are adopted for describing the data flows below.

In the remote receive data flow, the CPU of the remote socket receives network data using NIC 200 of the local socket. The flow starts by NIC 200 receiving a packet from the network. Dispatcher 124 of NIC 200 directs the packet to the processing route that includes tunneling logic 150, and sends the packet via peer interface 140 to the memory coherence fabric. The memory coherence fabric directs the packet to the remote socket over the coherence bus. Tunneling termination logic 164 of NIC 204 receives the packet via peer interface 140 of NIC 204. NIC 204 directs the packet via socket selectors 128 and 172 to receive logic 160, which sends the packet to the CPU of the remote socket via host interface 136, possibly following offloading processing by offloading unit 54.

In the remote transmit data flow the CPU of the remote socket transmits data to the network via NIC 200 of the local socket. The flow starts by the CPU of the remote socket sending data to transmit logic 168 of NIC 204 via host interface 136. Transmit logic 168 organizes the data in packets and sockets selectors 172 and 128 direct the packets to tunneling logic 150 of NIC 204. The tunneling logic sends the packets via peer interface 140 to the memory coherence fabric, and over the coherence bus to NIC 200 of the local socket. NIC 200 receives the packets via peer interface 140 and tunneling termination of NIC 200 directs the packets to the network via network interface 104.

FIG. 5 is a diagram that schematically describes receiving and transmitting data flows between a local socket and a network, in accordance with an embodiment that is described herein. The receive data flow starts by NIC 200 receiving from the network a packet whose destination is the CPU served by NIC 200. Dispatcher 124 of NIC 200 directs the packet to the route that includes receive logic 160, which may apply offloading or other processing to the packet, e.g., using offloading unit 54, and sends the packet to the CPU served by NIC 200 via host interface 136.

The local transmit flow starts by the CPU served by NIC 200 sending data to transmit logic 168 of NIC 200 via its host interface 136. The transmit logic organizes the data in packets and delivers the packets to the network via network interface 104 of NIC 200.

The system, NIC and data flow configurations shown in FIGS. 1-5 are depicted purely by way of example. In alternative embodiments, any other suitable system, NIC and data flow configurations can be used. Elements that are not necessary for understanding the principles of the disclosed embodiments, such as various interfaces, addressing circuits, timing and sequencing circuits and debugging circuits, have been omitted from the figures for clarity.

In the exemplary configuration shown in FIGS. 1-5, NIC 50 and CPU 38 are integrated in a single Integrated Circuit (IC), or in a Multi-Chip Module (MCM) in which the NIC die and the CPU die reside within a common package. In alternative embodiments, however, NIC 50 and CPU 38 may comprise separate devices or ICs, for example, on the mother board of the server, and may be interconnected by internal buses.

In some embodiments, CPU 38, NIC 50 or both comprise one or more processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

The different elements of CPU 38 and NIC 50 may be implemented using any suitable hardware, such as in an Application-Specific Integrated Circuit (ASIC) or Field-Programmable Gate Array (FPGA). In some embodiments, some elements of CPU 38, NIC 50 or both can be implemented using software, or using a combination of hardware and software elements.

In the embodiments described above, the NICs comprise offloading units for offloading the CPUs. This feature, however, is not mandatory. The disclosed techniques are applicable, and a CPU can benefit from caching data within a NIC, even when the NIC does not comprise an offloading unit.

In the disclosed techniques, the CPUs share memory resources by sending coherence transactions over the coherence bus. In alternative embodiments, the memory resources are not shared, and the coherence bus uses for the delivery of tunneled network packets and not coherence transactions.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Network Interface Controller (NIC), comprising:
a network interface, which is configured to receive incoming packets from a communication network;
a peer interface, which is configured to communicate with a peer NIC over a bus, not via the communication network; and
steering logic, which is configured to classify the packets received over the network interface into first incoming packets that are destined to a local Central Processing Unit (CPU) served by the NIC, and second incoming packets that are destined to a remote CPU served by the peer NIC, to apply at least one offloading task to the first incoming packets, to forward the first incoming packets to the local CPU over a bus after applying the at least one offloading task to the first incoming packets, and to forward the second incoming packets to the peer NIC over the peer interface not via the communication network, without applying the at least one offloading task to the second incoming packets.

2. The NIC according to claim 1, wherein the steering logic is configured to receive peer packets sent by the peer NIC over the peer interface, to classify the peer packets into first peer packets that are destined to the communication network, and second peer packets that are destined to the local CPU, and to forward the first peer packets to the communication network over the network interface and the second peer packets to the local CPU.

3. The NIC according to claim 1, wherein the steering logic is configured to receive CPU instructions that carry data produced by the local CPU, to classify the CPU instructions into first CPU instructions destined to the communication network and second CPU instructions destined to the remote CPU, and to forward the first CPU instructions to the communication network over the network interface and the second CPU instructions to the remote CPU via the peer interface.

4. The NIC according to claim 1, and comprising offloading circuitry that is configured to apply the at least one offloading task to the first incoming packets, wherein the offloading circuitry is configured to apply the at least one offloading task by selecting the at least one offloading task from among multiple predefined tasks, based on metadata embedded in the first incoming packets.

5. The NIC according to claim 1, wherein the steering logic is configured to classify the incoming packets received over the network interface based on destination data embedded in the incoming packets.

6. The NIC according to claim 1, wherein the steering logic is configured to receive remote CPU instructions that carry data sent by the remote CPU, and local CPU instructions that carry data sent by the local CPU, to select a first outbound destination for the remote CPU instructions from between the communication network and the local CPU, and a second outbound destination for the local CPU instructions from between the communication network and the remote CPU.

7. The NIC according to claim 6, wherein the steering logic is configured to select the first and second outbound destinations based on destination information embedded in the remote CPU instructions and in the local CPU instructions.

8. The NIC according to claim 1, wherein the steering logic is configured to forward both the first and the second incoming packets through the peer interface.

9. The NIC according to claim 1, and comprising a host interface separate from the peer interface and wherein the steering logic is configured to forward the first incoming packets through the host interface.

10. The NIC according to claim 1, wherein the at least one offloading task comprises encryption or decryption.

11. The NIC according to claim 1, wherein the at least one offloading task comprises firewall functionality.

12. The NIC according to claim 1, wherein the steering logic is configured to encapsulate the second incoming packets in accordance with a tunneling protocol, before forwarding the second incoming packets over the peer interface to the peer NIC.

13. The NIC according to claim 12, wherein the steering logic does not encapsulate the first incoming packets in accordance with a tunneling protocol, before forwarding the first incoming packets.

14. A method, comprising:
in a Network Interface Controller (NIC), receiving incoming packets from a communication network;
classifying the received incoming packets into first incoming packets that are destined to a local Central Processing Unit (CPU) served by the NIC, and second incoming packets that are destined to a remote CPU served by a peer NIC;
applying at least one offloading task to the first incoming packets, by the NIC; and
forwarding the first incoming packets to the local CPU over a bus after applying the at least one offloading task to the first incoming packets, and forwarding the second incoming packets to the peer NIC over a peer interface over a bus, not via the communication network, without applying the at least one offloading task to the second incoming packets.

15. The method according to claim 14, and comprising receiving in the NIC peer packets sent by the peer NIC over the peer interface, classifying the peer packets into first peer packets that are destined to the communication network, and second peer packets that are destined to the local CPU, and forwarding the first peer packets to the communication network over the network interface and the second peer packets to the local CPU.

16. The method according to claim 14, and comprising receiving in the NIC CPU instructions that carry data produced by the local CPU, classifying the CPU instructions into first CPU instructions destined to the communication network and second CPU instructions destined to the remote CPU, and forwarding the first CPU instructions to the communication network over the network interface and the second CPU instructions to the remote CPU via the peer interface.

17. The method according to claim 14, wherein applying the at least one offloading task comprises selecting the applied at least one offloading task from among multiple predefined tasks, based on metadata embedded in the first incoming packets.

18. The method according to claim 14, wherein classifying the incoming packets received over the network interface comprises classifying the incoming packets based on destination data embedded in the incoming packets.

19. The method according to claim 14, and comprising receiving in the NIC remote CPU instructions that carry data sent by the remote CPU, and local CPU instructions that carry data sent by the local CPU, selecting a first outbound destination for the remote CPU instructions from between the communication network and the local CPU, and a second outbound destination for the local CPU instructions from between the communication network and the remote CPU.

20. The method according to claim 19, wherein selecting the first and second outbound destinations comprises selecting the first and second outbound destinations based on destination information embedded in the remote CPU instructions and in the local CPU instructions.

21. A network node, comprising:
first and second Central Processing Units (CPUs), which are configured to communicate with one another over a bus;
a first Network Interface Controller (NIC) coupled to the first CPU; and
a second NIC, which is coupled to the second CPU and is configured to receive packets from a communication network, to classify the packets into first packets that are destined to the first CPU, and second packets that are destined to the second CPU, to forward the second packets to the second CPU, and to forward the first packets to the first NIC over the bus not via the communication network,
wherein the first NIC is configured to receive the first packets from the second NIC, to apply at least one offloading task to the first packets and to forward the first packets to the first CPU after applying the at least one offloading task to the first packets.

22. The network node according to claim 21, wherein the second NIC is configured to apply the at least one offloading task to the second packets, and to forward the second packets to the local CPU after applying the at least one offloading task to the second packets, and to forward the first packets to the first NIC, without applying the at least one offloading task to the first packets.

23. The network node according to claim 21, wherein the first NIC is not directly connected to the communication network.

24. The network node according to claim 21, wherein the first NIC is included with the first CPU within a same first CPU chipset and the second NIC is included with the second CPU within a same second CPU chipset.

25. A method of communication between first and second CPUs, associated with respective first and second Network Interface Controllers (NICs), and a communication network, comprising:
receiving, by the second NIC, incoming packets from the communication network;
classifying, by the second NIC, the received incoming packets into first packets that are destined to the first CPU and second packets that are destined to the second CPU;
forwarding the second packets to the second CPU by the second NIC;
forwarding the first packets from the second NIC to the first NIC;

applying at least one offloading task to the first packets by the first NIC; and forwarding the first packets to the first CPU from the first NIC, after applying the at least one offloading task to the first packets by the first NIC.

26. The method according to claim 25, and comprising applying the at least one offloading task to the second packets, by the second NIC, and wherein forwarding the second packets to the second CPU by the second NIC comprises forwarding the second packets to the second CPU by the second NIC, after applying the at least one offloading task to the second packets, and wherein forwarding the first packets from the second NIC to the first NIC comprises forwarding the first packets from the second NIC to the first NIC, without applying the at least one offloading task to the first packets by the second NIC.

* * * * *